M. H. HAGERTY.
Glass-Stopper.
No. 223,503. Patented Jan. 13, 1880.
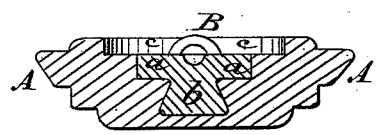
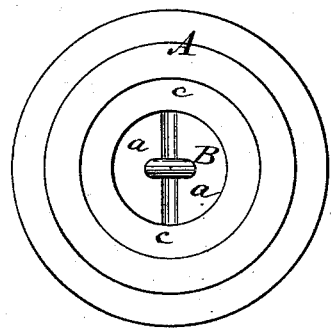
WITNESSES:
A. Schehl.
C. Sedgwick
INVENTOR:
M. H. Hagerty
BY Munn &Co
ATTORNEYS.

UNITED STATES PATENT OFFICE.

MICHAEL H. HAGERTY, OF BROOKLYN, NEW YORK.

GLASS STOPPER.

SPECIFICATION forming part of Letters Patent No. 223,503, dated January 13, 1880.

Application filed October 18, 1879.

*To all whom it may concern:*

Be it known that I, MICHAEL H. HAGERTY, of Brooklyn, in the county of Kings and State of New York, have invented a new and Improved Glass Stopper, of which the following is a specification.

The object of my invention is to provide a glass stopper for milk-bottles and other similar articles with a metal eye for the reception of the bail by which the said stopper is fastened to the bottle.

The invention consists in a glass stopper with a central depression, in which is a metal eye, the shank whereof is molded into the glass stopper in the center of the depression.

In the accompanying drawings, Figure 1 represents a cross-section of my improved stopper, and Fig. 2 is a top or plan view of the same.

Similar letters of reference indicate corresponding parts.

Referring to the drawings, A is the glass stopper, having in its top surface a depression, c. In the center of depression c is the metal eye B. Said eye has a back plate, a, from which projects a dovetailed or other suitably-shaped shank, b.

The stopper with its metal eye is made by molding and pressing the glass around the dovetailed shank b and back plate, a, so as to embed the said shank and back plate in the glass, and thus connect the metal eye with the glass stopper.

The advantage of providing the glass stopper with a metal eye is that the eye can be depressed to a level with the top of the stopper, instead of projecting above the top thereof, as would be necessary were the eye made of glass, and this depression of the eye in the stopper gives an even surface or bearing to the top of the stopper, whereby the bottles containing these stoppers can be packed closely and evenly in an upright position and on top of one another; further, by molding and pressing the metal eye into the stopper in the manner described the connection between the two is so firm that it is impossible for the eye to become loose and draw out without breaking the glass; further, this mode of connecting the eye with the stopper is simple and economical.

Having thus described my invention, I claim as new and desire to secure by Letters Patent—

1. As an improved article of manufacture, a glass stopper, A, provided with a metal eye, B, substantially as described, the back plate, a, and shank b of said eye being embedded in the glass stopper, as set forth.

2. The metal eye B, provided with the back plate, a, and the dovetail shank b, in combination with the glass stopper A, substantially as and for the purpose set forth.

MICHAEL H. HAGERTY.

Witnesses:
    W. C. DONN,
    C. SEDGWICK.